(12) United States Patent
Vorbach et al.

(10) Patent No.: US 7,434,191 B2
(45) Date of Patent: Oct. 7, 2008

(54) ROUTER

(75) Inventors: Martin Vorbach, Munich (DE); Daniel Bretz, Munich (DE)

(73) Assignee: Pact XPP Technologies AG, Munich (DE)

( * ) Notice: Subject to any disclaimer, the term of this patent is extended or adjusted under 35 U.S.C. 154(b) by 330 days.

(21) Appl. No.: 10/490,079

(22) PCT Filed: Sep. 18, 2002

(86) PCT No.: PCT/EP02/10479

§ 371 (c)(1),
(2), (4) Date: Nov. 2, 2004

(87) PCT Pub. No.: WO03/025781

PCT Pub. Date: Mar. 27, 2003

(65) Prior Publication Data

US 2005/0053056 A1   Mar. 10, 2005

(30) Foreign Application Priority Data

| Sep. 19, 2001 | (DE) | 101 46 132 |
| Nov. 5, 2001 | (DE) | 101 54 259 |
| Dec. 14, 2001 | (EP) | 01129923 |
| Jan. 18, 2002 | (EP) | 02001331 |
| Feb. 15, 2002 | (DE) | 102 06 653 |
| Feb. 18, 2002 | (DE) | 102 06 856 |
| Feb. 18, 2002 | (DE) | 102 06 857 |
| Feb. 21, 2002 | (DE) | 102 07 224 |
| Feb. 21, 2002 | (DE) | 102 07 226 |
| Feb. 27, 2002 | (DE) | 102 08 434 |
| Feb. 27, 2002 | (DE) | 102 08 435 |
| Mar. 21, 2002 | (DE) | 102 12 621 |
| Mar. 21, 2002 | (DE) | 102 12 622 |
| May 2, 2002 | (DE) | 102 18 681 |
| May 2, 2002 | (EP) | 02009868 |
| Jun. 12, 2002 | (DE) | 102 26 186 |
| Jun. 20, 2002 | (DE) | 102 27 650 |
| Aug. 7, 2002 | (DE) | 102 36 271 |
| Aug. 21, 2002 | (DE) | 102 38 174 |
| Aug. 27, 2002 | (DE) | 102 40 000 |
| Aug. 27, 2002 | (DE) | 102 40 022 |

(51) Int. Cl.
*G06F 17/50* (2006.01)

(52) U.S. Cl. ............................ 716/16; 716/12; 716/13; 716/14

(58) Field of Classification Search .................. 716/16, 716/12, 13, 14
See application file for complete search history.

(56) References Cited

U.S. PATENT DOCUMENTS 2,067,477 A   1/1937   Cooper (Continued)

FOREIGN PATENT DOCUMENTS

DE   044 16 881   5/1993

(Continued)

OTHER PUBLICATIONS

Fineberg et al., "Experimental Analysis of a Mixed-Mode Parallel Architecture Using Bitonic Sequene Sorting," Journal of Parallel and Distributed Computing, Academic Press, Duluth, MN, US, vol. 11, No. 3, Mar. 1, 1991, pp. 239-251.

(Continued)

*Primary Examiner*—Sun J Lin
(74) *Attorney, Agent, or Firm*—Kenyon & Kenyon LLP

(57) ABSTRACT

Configuration of a reconfigurable multidimensional field may include prioritizing required connections between cells, establishing connections having a high priority first, and establishing additional connections after the high priority connections have been established.

11 Claims, 6 Drawing Sheets

U.S. PATENT DOCUMENTS

| | | |
|---|---|---|
| 3,242,998 A | 3/1966 | Gubbins |
| 3,681,578 A | 8/1972 | Stevens |
| 3,757,608 A | 9/1973 | Willner |
| 3,855,577 A | 12/1974 | Vandierendonck |
| 4,233,667 A | 11/1980 | Devine et al. |
| 4,414,547 A | 11/1983 | Knapp et al. |
| 4,498,134 A | 2/1985 | Hansen et al. |
| 4,498,172 A | 2/1985 | Bhavsar |
| 4,566,102 A | 1/1986 | Hefner |
| 4,489,857 A | 2/1986 | Agrawal et al. |
| 4,590,583 A | 5/1986 | Miller |
| 4,591,979 A | 5/1986 | Iwashita |
| 4,663,706 A | 5/1987 | Allen et al. |
| 4,682,284 A | 7/1987 | Schrofer |
| 4,706,216 A | 11/1987 | Carter |
| 4,720,778 A | 1/1988 | Hansen et al. |
| 4,720,780 A | 1/1988 | Dolecek |
| 4,739,474 A | 4/1988 | Holsztynski |
| 4,761,755 A | 8/1988 | Ardini et al. |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Miranker et al. |
| 4,870,302 A | 9/1989 | Freeman |
| 4,882,687 A | 11/1989 | Gordon |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,967,340 A | 10/1990 | Dawes |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,043,978 A | 8/1991 | Nagler et al. |
| 5,047,924 A | 9/1991 | Matsubara et al. |
| 5,065,308 A | 11/1991 | Evans |
| 5,072,178 A | 12/1991 | Matsumoto |
| 5,081,375 A | 1/1992 | Pickett et al. |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,125,801 A | 6/1992 | Nabity et al. |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Lee et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,294,119 A | 3/1994 | Vincent et al. |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,336,950 A | 8/1994 | Popli et al. |
| 5,347,639 A | 9/1994 | Rechtschaffen et al. |
| 5,349,193 A | 9/1994 | Mott et al. |
| 5,353,432 A | 10/1994 | Richek et al. |
| 5,361,373 A | 11/1994 | Gilson |
| 5,379,444 A | 1/1995 | Mumme |
| 5,392,437 A | 2/1995 | Matter et al. |
| 5,410,723 A | 4/1995 | Schmidt et al. |
| 5,418,952 A | 5/1995 | Morley et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,574,930 A | 11/1996 | Halverson, Jr. et al. |
| 5,581,731 A | 12/1996 | King et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal et al. |
| 5,600,845 A | 2/1997 | Gilson |
| 5,611,049 A | 3/1997 | Pitts |
| 5,617,547 A | 4/1997 | Feeney et al. |
| 5,625,806 A | 4/1997 | Kromer |
| 5,634,131 A | 5/1997 | Matter et al. |
| 5,649,176 A | 7/1997 | Selvidge et al. |
| 5,649,179 A | 7/1997 | Steenstra et al. |
| 5,652,529 A | 7/1997 | Gould et al. |
| 5,652,894 A | 7/1997 | Hu et al. |
| 5,655,069 A | 8/1997 | Ogawara et al. |
| 5,655,124 A | 8/1997 | Lin |
| 5,657,330 A | 8/1997 | Matsumoto |

| Patent | Date | Inventor |
|---|---|---|
| 5,659,797 A | 8/1997 | Zandveld et al. |
| 5,675,743 A | 10/1997 | Mavity |
| 5,680,583 A | 10/1997 | Kuijsten |
| 5,713,037 A | 1/1998 | Wilkinson et al. |
| 5,717,943 A | 2/1998 | Barker et al. |
| 5,732,209 A | 3/1998 | Vigil et al. |
| 5,734,921 A | 3/1998 | Dapp et al. |
| 5,737,516 A | 4/1998 | Circello et al. |
| 5,742,180 A | 4/1998 | Detton et al. |
| 5,748,872 A | 5/1998 | Norman |
| 5,752,035 A | 5/1998 | Trimberger |
| 5,754,820 A | 5/1998 | Yamagami |
| 5,754,827 A | 5/1998 | Barbier et al. |
| 5,754,871 A | 5/1998 | Wilkinson et al. |
| 5,760,602 A | 6/1998 | Tan |
| 5,761,484 A | 6/1998 | Agarwal et al. |
| 5,773,994 A | 6/1998 | Jones |
| 5,778,439 A | 7/1998 | Timberger et al. |
| 5,784,636 A | 7/1998 | Rupp |
| 5,794,059 A | 8/1998 | Barker et al. |
| 5,794,062 A | 8/1998 | Baxter |
| 5,801,715 A | 9/1998 | Norman |
| 5,802,290 A | 9/1998 | Casselman |
| 5,821,774 A | 10/1998 | Veytsman et al. |
| 5,828,229 A | 10/1998 | Cliff et al. |
| 5,828,858 A | 10/1998 | Athanas et al. |
| 5,838,165 A | 11/1998 | Chatter |
| 5,841,973 A | 11/1998 | Cooke et al. |
| 5,844,888 A | 12/1998 | Markkula, Jr. et al. |
| 5,848,238 A | 12/1998 | Shimomura et al. |
| 5,854,918 A | 12/1998 | Baxter |
| 5,859,544 A | 1/1999 | Norman |
| 5,862,403 A | 1/1999 | Kanai et al. |
| 5,865,239 A | 2/1999 | Carr |
| 5,867,691 A | 2/1999 | Shiraishi |
| 5,867,723 A | 2/1999 | Peters et al. |
| 5,884,075 A | 3/1999 | Hester et al. |
| 5,887,162 A | 3/1999 | Williams et al. |
| 5,887,165 A | 3/1999 | Martel et al. |
| 5,889,982 A | 3/1999 | Rodgers et al. |
| 5,892,370 A | 4/1999 | Eaton et al. |
| 5,892,961 A | 4/1999 | Trimberger |
| 5,892,962 A | 4/1999 | Cloutier |
| 5,901,279 A | 5/1999 | Davis, III |
| 5,915,123 A | 6/1999 | Mirsky et al. |
| 5,924,119 A | 7/1999 | Sindhu et al. |
| 5,926,638 A | 7/1999 | Inoue |
| 5,927,423 A | 7/1999 | Wada et al. |
| 5,933,642 A | 8/1999 | Baxter et al. |
| 5,936,424 A | 8/1999 | Young et al. |
| 5,943,242 A | 8/1999 | Vorbach et al. |
| 5,956,518 A | 9/1999 | DeHon et al. |
| 5,960,193 A | 9/1999 | Guttag et al. |
| 5,960,200 A | 9/1999 | Eager et al. |
| 5,966,534 A | 10/1999 | Cooke et al. |
| 5,970,254 A | 10/1999 | Cooke et al. |
| 5,978,260 A | 11/1999 | Trimberger et al. |
| 5,978,583 A | 11/1999 | Ekanadham et al. |
| 5,996,083 A | 11/1999 | Gupta et al. |
| 5,999,990 A * | 12/1999 | Sharrit et al. .................. 710/8 |
| 6,003,143 A | 12/1999 | Kim et al. |
| 6,011,407 A | 1/2000 | New |
| 6,014,509 A | 1/2000 | Furtek et al. |
| 6,020,758 A | 2/2000 | Patel et al. |
| 6,021,490 A | 2/2000 | Vorbach et al. |
| 6,023,564 A | 2/2000 | Trimberger |
| 6,023,742 A | 2/2000 | Ebeling et al. |
| 6,026,481 A | 2/2000 | New et al. |
| 6,034,538 A | 3/2000 | Abramovici |
| 6,038,650 A | 3/2000 | Vorbach et al. |
| 6,038,656 A | 3/2000 | Cummings et al. |
| 6,047,115 A | 4/2000 | Mohan et al. |
| 6,049,222 A | 4/2000 | Lawman |
| 6,052,773 A | 4/2000 | DeHon et al. |
| 6,054,873 A | 4/2000 | Laramie |
| 6,058,469 A | 5/2000 | Baxter |
| 6,077,315 A | 6/2000 | Greenbaum et al. |
| 6,081,903 A | 6/2000 | Vorbach et al. |
| 6,085,317 A | 7/2000 | Smith |
| 6,086,628 A | 7/2000 | Dave et al. |
| 6,088,795 A | 7/2000 | Vorbach et al. |
| 6,092,174 A | 7/2000 | Roussakov |
| 6,105,105 A | 8/2000 | Trimberger et al. |
| 6,105,106 A | 8/2000 | Manning |
| 6,108,760 A | 8/2000 | Mirsky et al. |
| 6,119,181 A | 9/2000 | Vorbach et al. |
| 6,122,719 A | 9/2000 | Mirsky et al. |
| 6,125,408 A | 9/2000 | McGee et al. |
| 6,127,908 A | 10/2000 | Bozler et al. |
| 6,134,166 A | 10/2000 | Lytle et al. |
| 6,435,054 B1 | 10/2000 | Nguyen |
| 6,150,837 A | 11/2000 | Beal et al. |
| 6,150,839 A | 11/2000 | New et al. |
| 6,170,051 B1 | 1/2001 | Dowling |
| 6,172,520 B1 | 1/2001 | Lawman et al. |
| 6,173,434 B1 | 1/2001 | Wirthlin et al. |
| 6,185,256 B1 | 2/2001 | Saito et al. |
| 6,188,240 B1 | 2/2001 | Nakaya |
| 6,198,304 B1 | 3/2001 | Sasaki |
| 6,202,182 B1 | 3/2001 | Abramovici et al. |
| 6,211,697 B1 | 4/2001 | Lien et al. |
| 6,212,650 B1 | 4/2001 | Guccione |
| 6,216,223 B1 | 4/2001 | Revilla et al. |
| 6,219,833 B1 | 4/2001 | Solomon et al. |
| 6,230,307 B1 | 5/2001 | Davis et al. |
| 6,240,502 B1 | 5/2001 | Panwar et al. |
| 6,243,808 B1 | 6/2001 | Wang |
| 6,256,724 B1 | 7/2001 | Hocevar et al. |
| 6,260,179 B1 | 7/2001 | Ohsawa et al. |
| 6,263,430 B1 | 7/2001 | Trimberger et al. |
| 6,279,077 B1 | 8/2001 | Nasserbakht et al. |
| 6,282,627 B1 | 8/2001 | Wong et al. |
| 6,282,701 B1 | 8/2001 | Wygodny et al. |
| 6,285,624 B1 | 9/2001 | Chen |
| 6,286,134 B1 | 9/2001 | Click, Jr. et al. |
| 6,288,566 B1 | 9/2001 | Hanrahan et al. |
| 6,289,440 B1 | 9/2001 | Casselman |
| 6,298,472 B1 | 10/2001 | Phillips et al. |
| 6,301,706 B1 | 10/2001 | Maslennikov et al. |
| 6,311,200 B1 | 10/2001 | Hanrahan et al. |
| 6,321,366 B1 | 11/2001 | Tseng et al. |
| 6,321,373 B1 | 11/2001 | Ekanadham et al. |
| 6,338,106 B1 | 1/2002 | Vorbach et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,370,596 B1 | 4/2002 | Dakhil |
| 6,378,068 B1 | 4/2002 | Foster et al. |
| 6,389,379 B1 | 5/2002 | Lin et al. |
| 6,389,579 B1 | 5/2002 | Phillips et al. |
| 6,392,912 B1 | 5/2002 | Hanrahan et al. |
| 6,398,383 B1 | 6/2002 | Huang |
| 6,400,601 B1 | 6/2002 | Sudo et al. |
| 6,404,224 B1 | 6/2002 | Azegami et al. |
| 6,405,299 B1 | 6/2002 | Vorbach et al. |
| 6,421,809 B1 | 7/2002 | Wuytack et al. |
| 6,421,817 B1 | 7/2002 | Mohan et al. |
| 6,425,068 B1 | 7/2002 | Vorbach et al. |
| 6,434,695 B1 | 8/2002 | Esfahani et al. |
| 6,434,699 B1 | 8/2002 | Jones et al. |
| 6,437,441 B1 | 8/2002 | Yamamoto |
| 6,457,116 B1 | 9/2002 | Mirsky et al. |
| 6,476,634 B1 | 11/2002 | Bilski |
| 6,477,643 B1 | 11/2002 | Vorbach et al. |
| 6,480,937 B1 | 11/2002 | Vorbach et al. |
| 6,480,954 B2 | 11/2002 | Trimberger et al. |

| | | | | | |
|---|---|---|---|---|---|
| 6,490,695 B1 | 12/2002 | Zagorski et al. | DE | 196 54 595 | 7/1998 |
| 6,496,971 B1 | 12/2002 | Lesea et al. | DE | 196 54 846 | 7/1998 |
| 6,513,077 B2 | 1/2003 | Vorbach et al. | DE | 197 04 044 | 8/1998 |
| 6,516,382 B2 | 2/2003 | Manning | DE | 197 04 728 | 8/1998 |
| 6,518,787 B1 | 2/2003 | Allegrucci et al. | DE | 197 04 742 | 9/1998 |
| 6,519,674 B1 | 2/2003 | Lam et al. | DE | 198 07 872 | 8/1999 |
| 6,525,678 B1 | 2/2003 | Veenstra et al. | DE | 198 61 088 | 2/2000 |
| 6,526,520 B1 | 2/2003 | Vorbach et al. | DE | 197 04 044 | 3/2000 |
| 6,538,468 B1 | 3/2003 | Moore | DE | 199 26 538 | 12/2000 |
| 6,539,477 B1 | 3/2003 | Seawright | DE | 100 28 397 | 12/2001 |
| 6,542,844 B1 | 4/2003 | Hanna | DE | 100 36 627 | 2/2002 |
| 6,542,998 B1 | 4/2003 | Vorbach et al. | DE | 101 29 237 | 4/2002 |
| 6,571,381 B1 | 5/2003 | Vorbach et al. | DE | 199 26 538 | 12/2002 |
| 6,587,939 B1 | 7/2003 | Takano | DE | 102 04 044 | 8/2003 |
| 6,633,181 B1 | 10/2003 | Rupp | EP | 0 208 457 | 1/1987 |
| 6,657,457 B1 | 12/2003 | Hanrahan et al. | EP | 0 221 360 | 5/1987 |
| 6,687,788 B2 | 2/2004 | Vorbach et al. | EP | 0 398 552 | 11/1990 |
| 6,697,979 B1 | 2/2004 | Vorbach et al. | EP | 0 428 327 | 5/1991 |
| 6,704,816 B1 | 3/2004 | Burke | EP | 0 463 721 | 1/1992 |
| 6,708,325 B2 | 3/2004 | Cooke et al. | EP | 0 477 809 | 4/1992 |
| 6,504,398 B1 | 4/2004 | Vorbach | EP | 0 485 690 | 5/1992 |
| 6,717,436 B2 | 4/2004 | Kress et al. | EP | 0 427 029 | 8/1992 |
| 6,721,830 B2 | 4/2004 | Vorbach et al. | EP | 0 497 029 | 8/1992 |
| 6,728,871 B1 | 4/2004 | Vorbach et al. | EP | 0 539 595 | 5/1993 |
| 6,757,847 B1 | 6/2004 | Farkash et al. | EP | 0 628 917 | 12/1994 |
| 6,757,892 B1 | 6/2004 | Gokhale et al. | EP | 0 678 985 | 10/1995 |
| 6,782,445 B1 | 8/2004 | Olgiati et al. | EP | 0 686 915 | 12/1995 |
| 6,785,826 B1 | 8/2004 | Durham et al. | EP | 0 707 269 | 4/1996 |
| 6,803,787 B1 | 10/2004 | Wicker, Jr. | EP | 0 735 685 | 10/1996 |
| 6,871,341 B1 | 3/2005 | Shyr | EP | 0 835 685 | 10/1996 |
| 6,886,092 B1 | 4/2005 | Douglass et al. | EP | 0 746 106 | 12/1996 |
| 6,901,502 B2 | 5/2005 | Yano et al. | EP | 0 748 051 | 12/1996 |
| 6,928,523 B2 | 8/2005 | Yamada | EP | 0 726 532 | 7/1998 |
| 6,961,924 B2 | 11/2005 | Bates et al. | EP | 0 926 594 | 6/1999 |
| 7,010,667 B2 | 3/2006 | Vorbach et al. | EP | 1 102 674 | 7/1999 |
| 7,237,087 B2 | 6/2007 | Vorbach et al. | EP | 1 102 674 | 5/2001 |
| 7,254,649 B2 | 8/2007 | Subramanian et al. | EP | 1 146 432 | 10/2001 |
| 2001/0010074 A1 | 7/2001 | Nishihara et al. | EP | 0 696 001 | 12/2001 |
| 2001/0032305 A1 | 10/2001 | Barry | EP | 01 102 674 | 9/2003 |
| 2002/0038414 A1 | 3/2002 | Taylor et al. | FR | 2 752 466 | 2/1998 |
| 2002/0045952 A1 | 4/2002 | Blemel | JP | 58-58672 | 4/1983 |
| 2002/0083308 A1 | 6/2002 | Pereira et al. | JP | 2-130023 | 5/1990 |
| 2002/0103839 A1 | 8/2002 | Ozawa | JP | 2-226423 | 9/1990 |
| 2002/0138716 A1 | 9/2002 | Paul et al. | JP | 5-276007 | 10/1993 |
| 2002/0143505 A1 | 10/2002 | Drusinsky | JP | 05-509184 | 12/1993 |
| 2002/0144229 A1 | 10/2002 | Hanrahan | JP | 7-154242 | 6/1995 |
| 2002/0165886 A1 | 11/2002 | Lam | JP | 8-44581 | 2/1996 |
| 2003/0001615 A1 | 1/2003 | Sueyoshi et al. | JP | 8-250685 | 9/1996 |
| 2003/0014743 A1 | 1/2003 | Cooke et al. | JP | 9-27745 | 1/1997 |
| 2003/0046607 A1 | 3/2003 | Vorbach | JP | 11-307725 | 11/1999 |
| 2003/0052711 A1 | 3/2003 | Taylor et al. | JP | 2000-181566 | 6/2000 |
| 2003/0055861 A1 | 3/2003 | Lai et al. | WO | WO90/04835 | 5/1990 |
| 2003/0056085 A1 | 3/2003 | Vorbach | WO | WO90/11648 | 10/1990 |
| 2003/0056091 A1 | 3/2003 | Greenberg | WO | WO92/01987 | 2/1992 |
| 2003/0056202 A1 | 3/2003 | Vorbach | WO | WO93/11503 | 6/1993 |
| 2003/0086300 A1 | 5/2003 | Noyes et al. | WO | WO94/06077 | 3/1994 |
| 2003/0093662 A1 | 5/2003 | Vorbach et al. | WO | WO94/08399 | 4/1994 |
| 2003/0097513 A1 | 5/2003 | Vorbach et al. | WO | WO95/00161 | 1/1995 |
| 2003/0123579 A1 | 7/2003 | Safavi et al. | WO | WO95/26001 | 9/1995 |
| 2003/0135686 A1 | 7/2003 | Vorbach et al. | WO | WO98/26356 | 6/1998 |
| 2003/0192032 A1 | 10/2003 | Andrade et al. | WO | WO98/28697 | 7/1998 |
| 2004/0015899 A1 | 1/2004 | May et al. | WO | WO98/29952 | 7/1998 |
| 2004/0025005 A1 | 2/2004 | Vorbach et al. | WO | WO98/31102 | 7/1998 |
| 2004/0168099 A1 | 8/2004 | Vorbach et al. | WO | WO98/35299 | 8/1998 |
| 2004/0199688 A1 | 10/2004 | Vorbach et al. | WO | WO99/00731 | 1/1999 |
| | | | WO | WO99/00739 | 1/1999 |
| FOREIGN PATENT DOCUMENTS | | | WO | WO99/12111 | 3/1999 |
| | | | WO | WO99/32975 | 7/1999 |
| DE | 42 21 278 | 1/1994 | WO | WO99/40522 | 8/1999 |
| DE | 44 16 881 | 11/1994 | WO | WO99/44120 | 9/1999 |
| DE | 38 55 673 | 11/1996 | WO | WO99/44147 | 9/1999 |
| DE | 196 51 075 | 6/1998 | WO | WO00/17771 | 3/2000 |
| DE | 196 54 593 | 7/1998 | WO | WO00/38087 | 6/2000 |

| WO | WO 00/77652 | 12/2000 |
| WO | WO00/77652 | 12/2000 |
| WO | WO01/55917 | 8/2001 |
| WO | WO02/13000 | 2/2002 |
| WO | WO02/21010 | 3/2002 |
| WO | WO02/29600 | 4/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/032975 | 4/2003 |
| WO | WO03/036507 | 5/2003 |
| WO | WO2004/114128 | 12/2004 |

OTHER PUBLICATIONS

Arabi et al., "PLD Integrates Dedicated High-speed Data Buffering, Complex State Machine, and Fast Decode Array," conference record on WESCON '93, Sep. 28, 1993, pp. 432-436.

Ade et al., "Minimum Memory Buffers in DSP Applications," Electronics Letters, vol. 30, No. 6, Mar. 17, 1994, pp. 469-471.

Villasenor, John et al., "Configurable Computing," *Scientific American*, vol. 276, No. 6, Jun. 1997, pp. 66-71.

Villasenor, John et al., "Configurable Computing Solutions for Automatic Target Recognition," *IEEE*, 1996 pp. 70-79.

Tau, Edward et al., "A First Generation DPGA Implementation," *FPD'95*, pp. 138-143.

Athanas, Peter et al., "Quantitative analysis of floating point arithmetic on FPGA based custom computing machines," IEEE Symposium on FPGAs For Custom Computing Machines, *IEEE Computer Society Press*, Apr. 19-21, 1995, pp. i-vii, I-222.

Athanas, Peter et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397-400.

Bittner, Ray A. Jr., "Wormhole Run-time Reconfiguration: Conceptualization and VLSI Design of a High Performance Computing System," *Dissertation*, Jan. 23, 1997, pp. I-XX, 1-415.

Myers, G. "Advances in Computer Architecture," Wiley-Interscience Publication, 2nd ed., John Wiley & Sons, Inc. pp. 463-494, 1978.

M. Saleeba, "A Self-Contained Dynamically Reconfigurable Processor Architecture," Sixteenth Australian Computer Science Conference, ASCS-16, QLD, Australia, Feb. 1993.

M. Morris Mano, "Digital Design," by Prentice Hall, Inc., Englewood Cliffs, New Jersey 07632, 1984, pp. 119-125, 154-161.

Maxfield, C. "Logic that Mutates While-U-Wait" EDN (Bur. Ed) (USA), EDN (European Edition), Nov. 7, 1996, Cahners Publishing, USA.

Norman, Richard S., "Hyperchip Business Summary, The Opportunity," Jan. 31, 2000, pp. 1-3.

Ferrante J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Libray.

Hwang L. et al., "Min-cut Replication in Partitioned Networks" IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

Baumgarte, V., et al., PACT XPP "A Self-reconfigurable Data Processing Architecture," PACT Info. GMBH, Munchen Germany 2001.

Jantsch, Axel et al., "A Case Study on Hardware/software Partitioning," Royal Institute of Technology, Kista, Sweden, Apr. 10, 1994 IEEE, pp. 111-118.

Becker, J. et al., "Parallelization in Co-compilation for Configurable Accelerators—a Host/accelerator Partitioning Compilation Method," proceedings of Asia and South Pacific Design Automation Conference, Yokohama, Japan, Feb. 10-13, 1998.

Isshiki, Tsuyoshi et al., "Bit-Serial Pipeline Synthesis for Multi-FPGA Systems with C++ Design Capture," 1996 IEEE, pp. 38-47.

Weinhardt, Markus, "Ubersetzingsmethoden fur strukturprogrammierbare rechner ," Dissertation for Doktors der Ingenieurwissenschaften der Universitat Karlsruhe: Jul. 1, 1997.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999.

K. Wada et al., "A Performance Evaluation of Tree-based Coherent Distributed Shared Memory" Proceedings of the Pacific RIM Conference on Communications, Comput and Signal Processing, Victoria, May 19-21, 1993.

Nilsson et al., "The Scalable Tree Protocol—A Cache Coherence Approaches for Large-Scale Multiprocessors" IEEE, pp. 498-506 Dec. 1992.

Wu et al., "A New Cache Directory Scheme", IEEE, pp. 466-472, Jun. 1996.

Hauck "The Roles of FPGA's in Reprogrammable Systems," IEEE, Apr. 1998, pp. 615-638.

Wittig et al., "OneChip: An FPGA Processor with Reconfigurable Logic" IEEE, 1996 pp. 126-135.

Cadambi et al., "Managing Pipeline-reconfigurable FPGAs," ACM, 1998, pp. 55-64.

Hong Yu Xu et al., "Parallel QR Factorization on a Block Data Flow Architecture" Conference Proceeding Article, Mar. 1, 1992, pp. 332-336 XPO10255276, p. 333, Abstract 2.2, 2.3, 2.4—p. 334.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-1666.

Weinhardt, M. "Compilation Methods for Structure-programmable Computers", dissertation, ISBN 3-897022-011-3, 1997.

Cardoso, J.M.P., "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (English Abstract included).

Kung, "Deadlock Avoidance for Systolic Communication", 1988 Conference Proceedings of 15th Annual International Symposium on Computer Architecture, May 30, 1998, pp. 252-260.

TMS320C54X DSP: CPU and Peripherals, Texas Instruments, 1996, pp. 6-26 to 6-46.

TMS320C54x DSP: Mnemonic Instruction Set, Texas Instruments, 1996, p. 4-64.

Xlinx, "Logic Cell Array Families: XC4000, XC4000A and XC4000H", product description, pp. 2-7 to 2-15, Additional XC3000, XC31000 and XC3100A Data, pp. 8-16 and 9-14.

Miller, Michael J. et al., "High-Speed FIFOs Contend with Widely Differing Data Rates: Dual-port RAM Buffer and Dual-pointer System Provide Rapid, High-density Data Storage and Reduce Overhead", Computer Design, Sep. 1, 1985, pp. 83-86.

Forstner, Peter "Wer Zuerst Kommt, Mahlt Zuerstl: Teil 3: Einsatzgebiete und Anwendungsbeispiele von FIFO-Speichern", Elektronik, Aug. 2000, pp. 104-109.

John R. Hauser et al., "Garp: A MIPS Processor with a Reconfigurable Coprocessor", University of California, Berkeley, IEEE, 1997, pp. 12-21.

Jorg Donandt, "Improving Response Time of Programmable Logic Controllers by Use of a Boolean Coprocessor", AEG Research Institute Berlin, IEEE, 1989, pp. 4-167-4-169.

Alexandre F. Tenca et al., "A Variable Long-Precision Arithmetic Unit Design for Reconfigurable Coprocessor Architectures", University of California, Los Angeles, 1998, pp. 216-225.

Andreas Koch et al., "Practical Experiences with the SPARXIL Co-Processor", 1998, IEEE, pp. 394-398.

Gokhale M. B. et al., "Automatic Allocation of Arrays to Memories in FPGA processors with Multiple Memory Banks", Field-Programmable Custom Computing Machines, 1999, IEEE, pp. 63-67.

Christian Siemers, "Rechenfabrik Ansaetze Fuer Extrem Parallele Prozessoren", Verlag Heinze Heise GmbH:, Hannover, DE No. 15, Jul. 16, 2001, pp. 170-179.

Pedro Diniz et al., "Automatic Synthesis of Data Storage and Control Structures for FPGA-based Computing Engines", 2000, IEEE, pp. 91-100.

Markus Weinhardt et al., "Pipeline Vectorization for Reconfigurable Systems", 1999, IEEE, pp. 52-60.

Lizy John et al., "A Dynamically Reconfigurable Interconnect for Array Processors", vol. 6, No. 1, Mar. 1998, IEEE, pp. 150-157.

Fineberg, Samuel et al., "Experimental Analysis of a Mixed-Mode Parallel Architecture Using Bitonic Sequence Sorting", vol. 11, No. 3, Mar. 1991, pp. 239-151.

Jacob, Jeffrey et al., "Memory Interfacing and Instruction Specification for Reconfigurable Processors", ACM 1999, pp. 145-154.

Ye, Z.A. et al., "A Compiler for a Processor With A Reconfigurable Functional Unit," FPGA 2000 ACM/SIGNA International Symposium on Field Programmable Gate Arrays, Monterey, CA Feb. 9-11, 2000, pp. 95-100.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Villasensor, J. et al., "Express Letters Video Communications Using Rapidly Reconfigurable Hardware," IEEE Transactions on Circuits and Systems for Video Technology, IEEE, Inc. NY, Dec. 1995, pp. 565-567.

Athanas et al., "Processor Reconfiguration Through Instruction-Set Metamorphosis," 1993, IEEE Computers, pp. 11-18.

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.

Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12th International Conference FPL 2002, Proceedings (Lecture Notes in Computer Science, vol. 2438) Springer-Verlag Berlin, Germany, 2002, pp. 864-874.

Hwang, K., "Advanced Computer Architecture—Parallelism, Scalability, Programmability," 1993, McGraw-Hill, Inc., pp. 348-355.

IBM Technical Disclosure Bulletin, IBM Corp., New York, XP000424878, Bd. 36, Nr. 11, Nov. 1, 1993, pp. 335-336.

Lee et al., "A new distribution network based on controlled switching elements and its applications," IEEE/ACT Trans. of Networking, vol. 3, No. 1, pp. 70-81, Feb. 1995.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the 3rd Australian Computer Architecture Conference, Perth, John Morris, Ed., Feb. 2-3, 1998, pp. 169-178.

Xilinx, "Spartan and SpartanXL Families Field Programmable Gate Arrays," Jan. 1999, Xilinx, pp. 4-3 through 4-70.

Abnous, A., et al., "The Pleiades Architecture," Chapter I of *The Application of Programmable DSPs in Mobile Communications*, A. Gatherer and A. Auslander, Ed., Wiley, 2002, pp. 1-33.

Alippi, et al., "Determining the Optimum Extended Instruction Set Architecture for Application Specific Reconfigurable VLIW CPUs," IEEE, 2001, pp. 50-56.

Athanas, "A Functional Reconfigurable Architecture and Compiler for Adoptive Computing," IEEE, pp. 49-55, not dated.

Beck et al., "From control flow to data flow," TR 89-1050, Oct. 1989, Dept. of Computer Science, Cornell University, Ithaca, NY, pp. 1-25.

Callahan, et al., "The Garp Architecture and C Compiler," Computer, Apr. 2000, pp. 62-69.

Chen et al., "A reconfigurable multiprocessor IC for rapid prototyping of algorithmic-specific high-speed DSP data Paths," IEEE Journal of Solid-State Circuits, vol. 27, No. 12, Dec. 1992, pp. 1895-1904.

DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

Dutt, et al., "If Software is King for Systems-in-Silicon, What's New in Compiler?," IEEE, 1997, pp. 322-325.

Fornaciari, et al., System-level power evaluation metrics, 1997 Proceedings of the 2nd Annual IEEE International Conference on Innovative Systems in Silicon, New York, NY, Oct. 1997, pp. 323-330.

Franklin, Manoj et al., "A Fill-Unit Approach to Multiple Instruction Issue," Proceedings of the Annual International Symposium on Microarchitecture, Nov. 1994, pp. 162-171.

Hartstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31. 4.3 (3 pages).

Hedge, S.J., "3D WASP Devices for On-line Signal and Data Processing," 1994, International Conference on Wafer Scale Integration, pp. 11-21.

Iseli, C.,et al. "A C++ Compiler for FPGA Custom Execution Units Synthesis," IEEE, 1995, pp. 173-179.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Koren et al., "A data-driven VLSI array for arbitrary algorithms," IEEE Computer Society, Long Beach, CA vol. 21, No. 10, Oct. 1, 1988, pp. 30-34.

Lee, Jong-eun et al., "Reconfigurable ALU Array Architecture with Conditional Execution," International Soc. Design Conference (ISOOC) [online] Oct. 25, 2004, Seoul, Korea, 5 pages.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317. [This references is in Chinese, but should be comparable in content to the Ling et al. reference above].

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

Piotrowski, A., "IEC-BUS, Die Funktionsweise des IEC-Bus unde seine Anwendung in Geräten and Systemen," 1987, Franzis-Verlag GmbH, München, pp. 20-25.

Razdan et al., A High-Performance Microarchitecture with Hardware-Programmable Functional Units, Micro-27, Proceedings of the 27th Annual International Symposium on Microarchitecture, IEEE Computer Society and Association for Computing Machinery, Nov. 30-Dec. 2, 1994, pp. 172-180.

Schmit, et al., Hidden Markov Modeling and Fuzzy Controllers in FPGAs, FPGAs for Custom Computing machines, 1995; Proceedings, IEEE Symposium in Napa Valley, CA, Apr. 1995, pp. 214-221.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the 3rd Australian Computer Architecture Conference, Perth, John Morris, Ed., Feb. 2-3, 1998, pp. 169-178.

Simunic, et al., Source Code Optimization and Profiling of Energy Consumation in Embedded Systems, Proceedings of the 13th International Symposium on System Synthesis, Sep. 2000, pp. 193-198.

Skokan, Z.E., "Programmable logic machine (A programmable cell array)," IEEE Journal of Solid-State Circuits, vol. 18, Issue 5, Oct. 1983, pp. 572-578.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

The XPP White Paper, Release 2.1, PACT—A Technical Perspective, Mar. 27, 2002, pp. 1-27.

Weinhardt, M., "Compilation Methods for Structure-programmable Computers," dissertation, ISBN 3-89722-011-3, 1997, [Table of Contents and English Abstract Provided].

Weinhardt, Markus et al., "Pipeline Vectorization," IEEE Transactions on Computer-Aided Design of Integrated Circuits and Systems, vol. 20, No. 2, Feb. 2001, pp. 234-248.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.

Zhang, et al., Architectural Evaluation of Flexible Digital Signal Processing for Wireless Receivers, Signals, Systems and Computers, 2000; Conference Record of the Thirty-Fourth Asilomar Conference, Bd. 1, Oct. 29, 2000, pp. 78-83.

\* cited by examiner

Bounding Box

Two Right Bus Segments are Used

Every Route Must have a Single Path
Between Outport Split and Inport Join

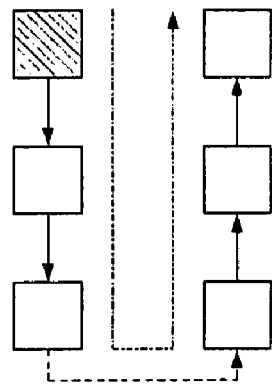
Fig. xxta
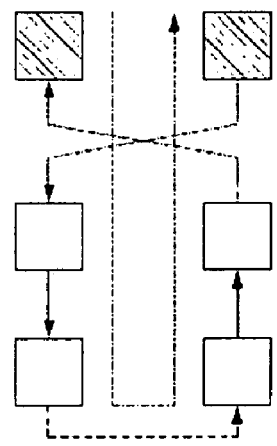
Fig. xxtb
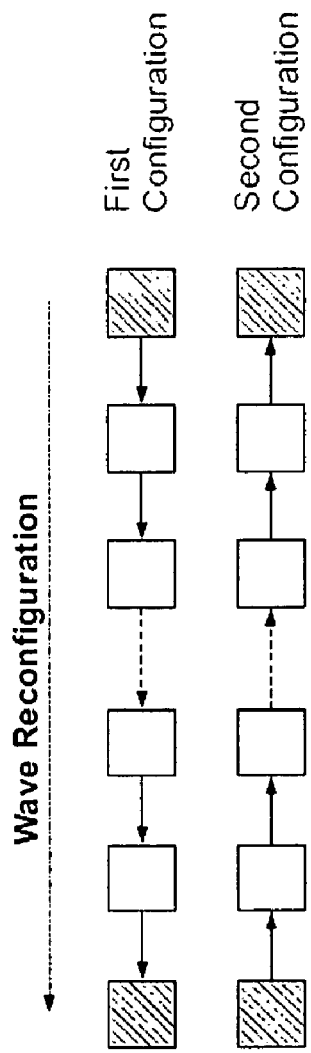
Fig. xxsa
(Prior Art)
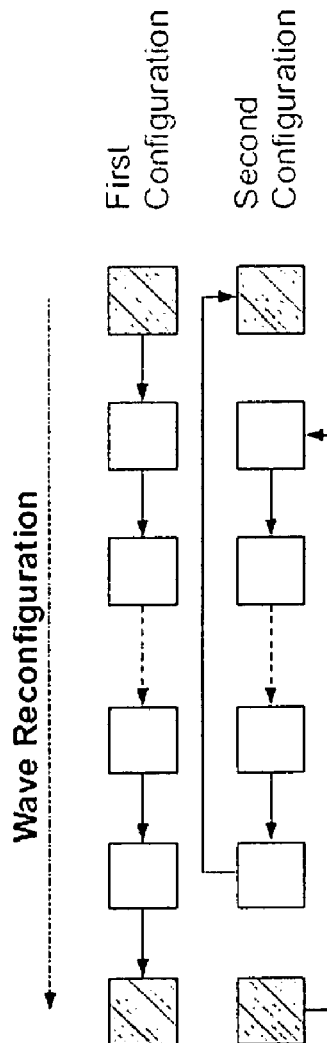
Fig. xxsb

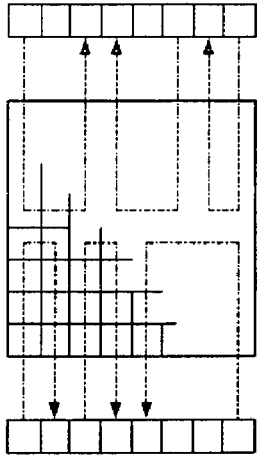
Fig. xxwc
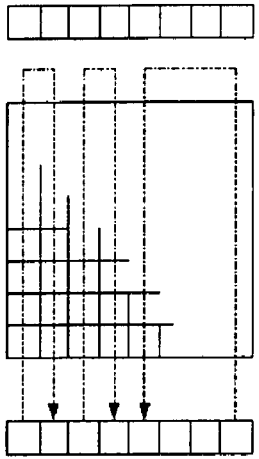
Fig. xxvc
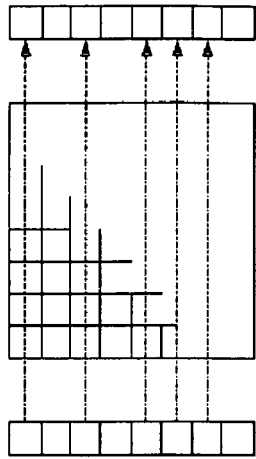
Fig. xxuc
(Prior Art)
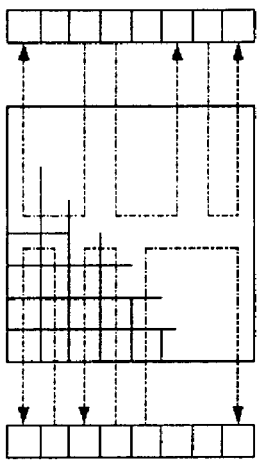
Fig. xxwb
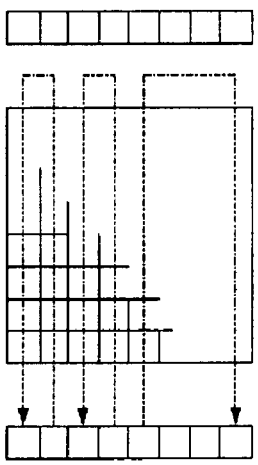
Fig. xxvb
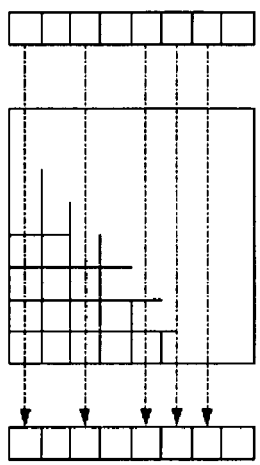
Fig. xxub
(Prior Art)
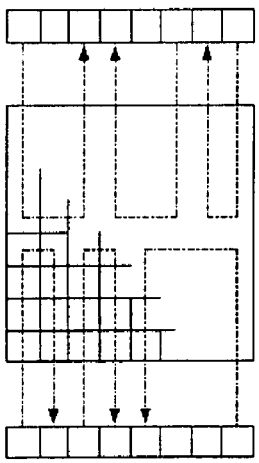
Fig. xxwa
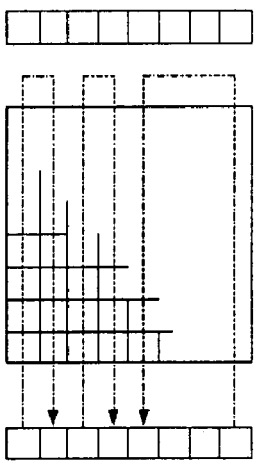
Fig. xxva
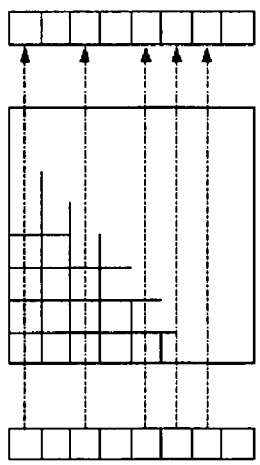
Fig. xxua
(Prior Art)

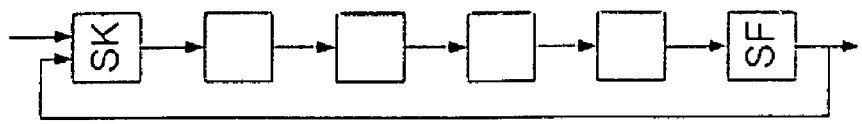
Fig. xxxf (Prior Art)
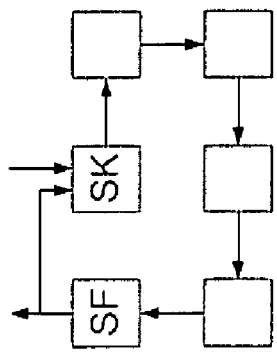
Fig. xxxd
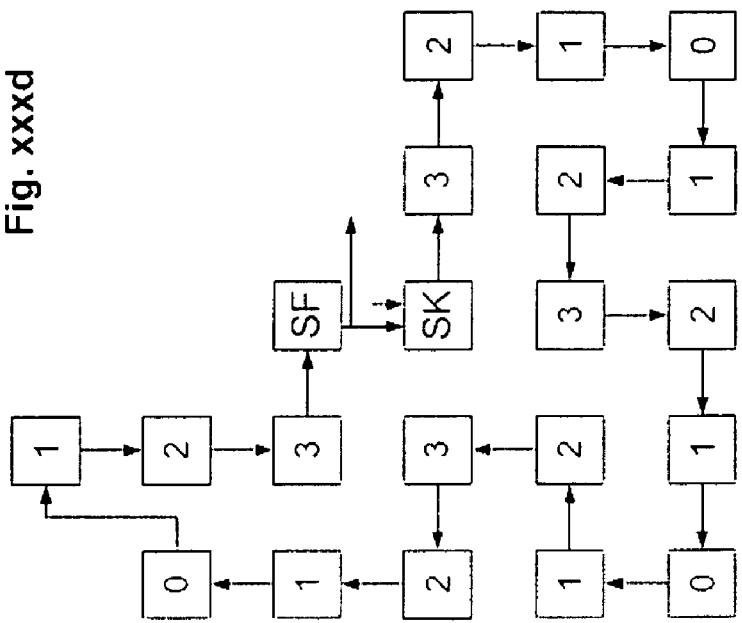
Fig. xxxe
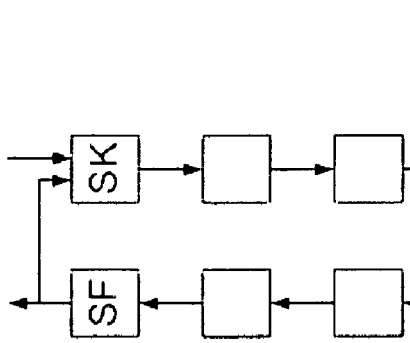
Fig. xxxb
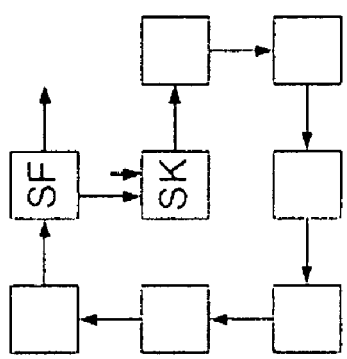
Fig. xxxc
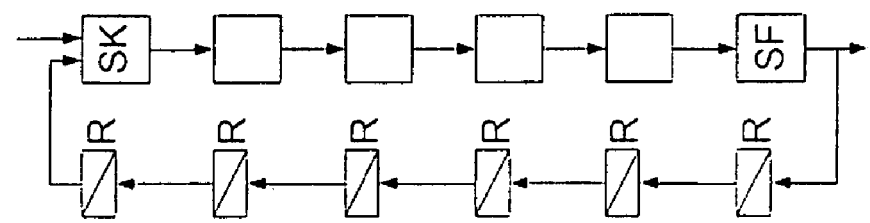
Fig. xxxa

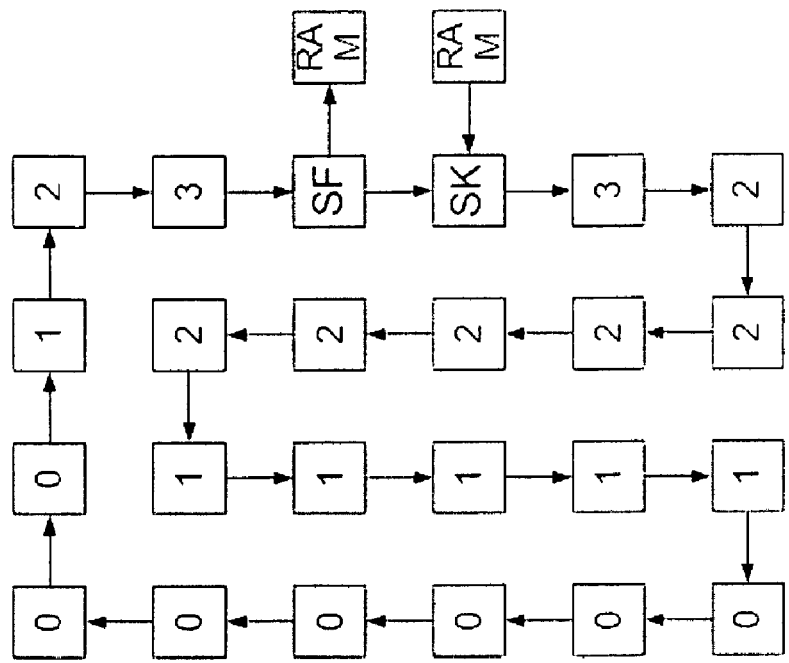
Fig. xxxh
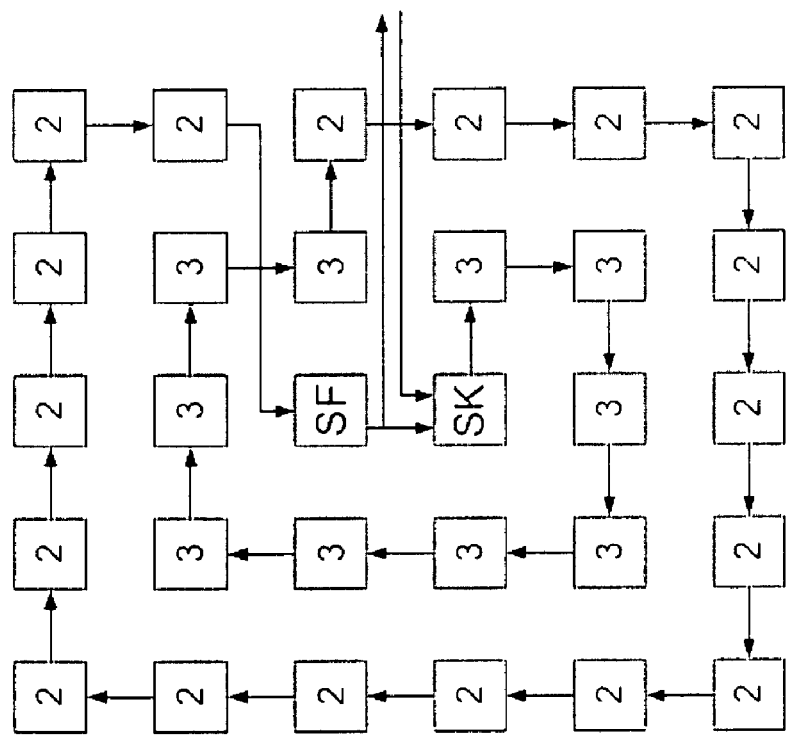
Fig. xxxg

ROUTER

FIELD OF THE INVENTION

The present invention relates to configurable modules and the like, in particular the management of data streams therein, in particular with the placement of resources and routing of connections between cells, etc.

BACKGROUND INFORMATION

Multidimensional fields of data processing cells are already known. The generic class of these modules includes in particular systolic arrays, neural networks, multiprocessor systems, processors having a plurality of arithmetic units and/or logic cells and/or communicative/peripheral cells (IO), interconnection and network modules such as crossbar switches as well as known modules of the generic types FPGA, DPGA, Chameleon, XPUTER, etc. In particular there are known modules in which first cells are reconfigurable during run time without interfering with the operation of other cells (see, for example, German Patent No. 44 16 881, German Patent Application Nos. DE 197 81 412.3, DE 197 81 483.2, DE 196 54 846.2-53, DE 196 54 593.5-53, DE 197 04 044.6-53, DE 198 80 129.7, DE 198 61 088.2-53, and DE 199 80 312.9, International Application No. PCT/DE 00/01869, German Patent Application Nos. DE 100 36 627.9-33, DE 100 28 397.7, DE 101 10 530.4, and DE 101 11 014.6, International Application No. PCT/EP 00/10516, and European Application No. EP 01 102 674.7). These are herewith incorporated fully into the present text for disclosure purposes. Reference is also made to the Chameleon system processor architecture. However, the usability of the structure mentioned last for data processing purposes is more comparable to an arrangement described in German Patent Application No. DE 101 03 624.

The data processing cells of these modules may now execute different functions such as Boolean and/or arithmetic operations on input operands. Connections running between the cells are also adjustable and typically include buses capable of interconnecting in various ways and thus creating a multidimensional field whose interconnection is adjustable. The cells exchange information such as status signals, triggers or the data to be processed over the buses or other lines. The cells are typically arranged in rows and columns in a two-dimensional processor field, with the outputs of cells of a first row being connected to buses to which the inputs of cells of the next row are also to be connected. In a conventional design (Pact XPP), forward and backward registers are also provided for carrying data while bypassing cells on bus systems of other rows, achieving a balance of branches to be executed simultaneously, etc. There have already been proposals for providing such forward and/or backward registers with a functionality that goes beyond pure data transfer.

In general, however, it is necessary to define which cell performs which data processing steps, where this cell is situated and how it is connected. In the related art, strategies for automatic control of placement mechanisms and routing mechanisms are already known.

Placers, for example, typically operate according to a force method, which uses forces between cells for optimum placement of dependent cells by simulating connections by springs in a physical model. This usually yields a mostly suitable placement result.

In addition, German Patent No. 44 16 881, and German Patent Application Nos. DE 196 54 846.2-53 and DE 102 06 653.1 describe data processing methods for reconfigurable modules in which data is read out of one or more memories in each processing step and is then processed and written to one or more memories. According to the related art, the read and write memories are placed differently and are typically placed in opposition (FIGS. xxua, xxub, xxuc and German Patent Application No. DE 102 06 653.1, FIG. 3).

Special reconfiguration methods (wave reconfiguration) are also described in German Patent Application Nos. DE 197 04 728.9, DE 199 26 538.0, DE 100 28 397.7 for the aforementioned modules, thus permitting particularly efficient reconfiguration by jointly transmitting the reconfiguration information together with the last data to be processed via the data buses and/or trigger buses, and by reconfiguring the buses and cells immediately after successful processing.

To perform a certain type of data processing, each cell must be assigned a certain function and at the same time a suitable position in space and interconnection must be provided. Therefore, before the multidimensional processor field processes data as desired, it is necessary to ascertain which cell is to execute which function; a function must be defined for each cell involved in a data processing task, and the interconnection must be determined.

SUMMARY

An object of the present invention is to provide a novel embodiment for commercial use.

First, a method for creating configurations for multidimensional fields of reconfigurable cells for implementing given applications in which an application is broken down into individual modules and the elements necessary for performing this method are placed module by module. Such a breakdown into modules is advantageous, because then configurations may be determined more easily for these modules.

It may be particularly preferable if stationary elements are provided in at least one module in the method and these stationary elements are provided at predetermined locations and the non-fixed elements are subsequently placed. It is then possible to place modules among the individual mobile and/or immobile objects by minimizing assigned virtual forces.

Generally, it may also be desirable to arrange the function and interconnection in such a way that data processing may be performed as promptly as possible and with the best possible use of resources. Frequently however, e.g., due to hardware restrictions, it is impossible to find an arrangement that will ensure the desired data transfer in an optimum manner. Suboptimal arrangements must then be used.

It is now further proposed according to the present invention that, to improve the configuration for multidimensional fields of reconfigurably interconnected data processing cells, the required connections between the cells be prioritized, with connections having a high priority being established first and other connections being established subsequently.

This minimizes the use of suboptimal configurations due to the fact that it ensures that data having fewer restrictions due to a shortage of resources, such as a limited number of buses, etc., may stream over connections that are particularly important, e.g., due to a required high low latency time, etc.

It is therefore also preferably possible for connections to be prioritized, taking into account in particular an allowable delay in data processing. Prioritization may be performed by taking into account the maximum allowed delay and/or delay ratios of different connections. Delay ratios to be taken into account in prioritization preferably include a delay of "0," "longer than," "longer than or equal to" and "equal to."

FIGS. xxua-xxuc show the direction of data flow of each successive configuration changes.

FIGS. xxva-xxvc an example of a plurality of arrangements for two reconfiguration cycles.

FIGS. xxwa-xxwc show corresponding arrangements from several sides of the array may also be used at the same time; two corresponding reconfiguration cycles are illustrated.

FIG. xxsa shows that after each processing of a last data word, the next following configuration may be set immediately; only after reconfiguration of all the cells and buses involved is it possible to begin with the next data processing.

FIG. xxsb shows largely maintaining the direction of flow between the cells and merely exchanging the bus systems of the memories.

FIG. xxta shows memories for reading data and writing data situated close together.

FIG. xxtb shows that in performing a reconfiguration, only the bus systems between the read/write memories are exchanged.

FIG. xxxa shows the introduction of registers into the long feedback buses at regular intervals.

FIG. xxxb shows all the cells of a loop arranged as locally as possible around a loop head; the loop foot is placed as close to the loop head as possible.

FIG. xxxc shows a helical arrangement.

FIG. xxxd shows all the cells of a loop arranged as locally as possible around a loop head; the loop foot is placed as close to the loop head as possible.

FIG. xxxe shows a wave-shaped pattern.

FIG. xxxf shows a long feedback bus.

FIG. xxxg shows a coil.

FIG. xxxh shows rolling out a loop in three directions.

DETAILED DESCRIPTION

Figure 1A:
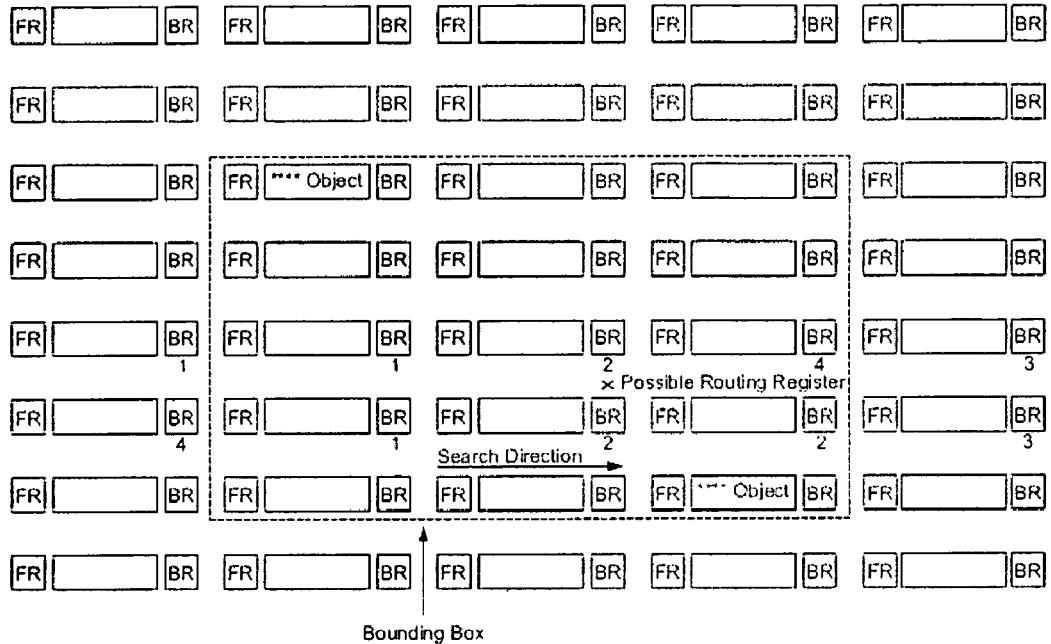
FIGS. 1a and 1b show PAE cells of an XPP architecture flanked by forward and backward registers.
Figure 1B:
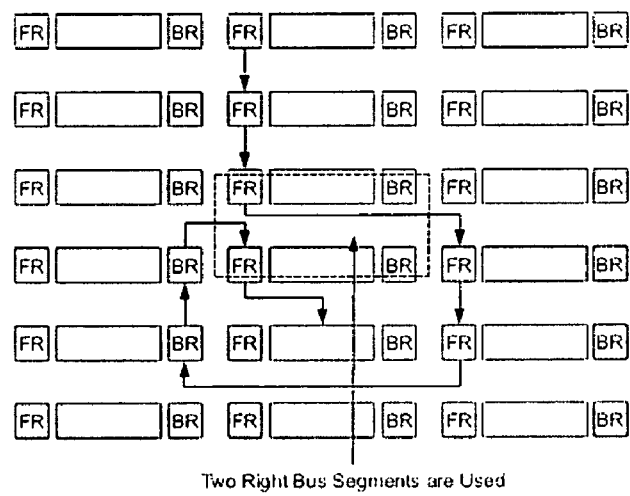

The connections among the cells of a configuration are produced by defining a boundary around cells and attempting first to connect the cells by connections within the boundary around cells. This is demonstrated with respect to FIGS. 1a and b, where the PAE cells of an XPP architecture of the present applicant are shown as elongated and flanked by forward and backward registers labeled as "FR" and "BR," respectively. A field part is delimited by a dotted line depicting the boundary. A route search will typically progress from the starting cell to the target cell only in the X direction, i.e., horizontally, and then if no more progress is possible in one row in the X direction, e.g., because no more suitable buses are available, then the row is switched to the Y direction. FIG. 1b shows an example of a possible connecting line when a direct connection is no longer possible between given cells.

It is possible that if all the required connections cannot be established within the boundary, a connection may be established outside of the boundary. If another connection cannot be established as needed, then in both cases, i.e., inside or outside, an existing connection should be severed and the additional connection established, whereupon an attempt is made to provide a replacement for the severed connection. However, it may be preferable to wait before going beyond the boundary until it is certain that no additional connections are establishable within the boundary even by disconnecting others.

Figure 2:
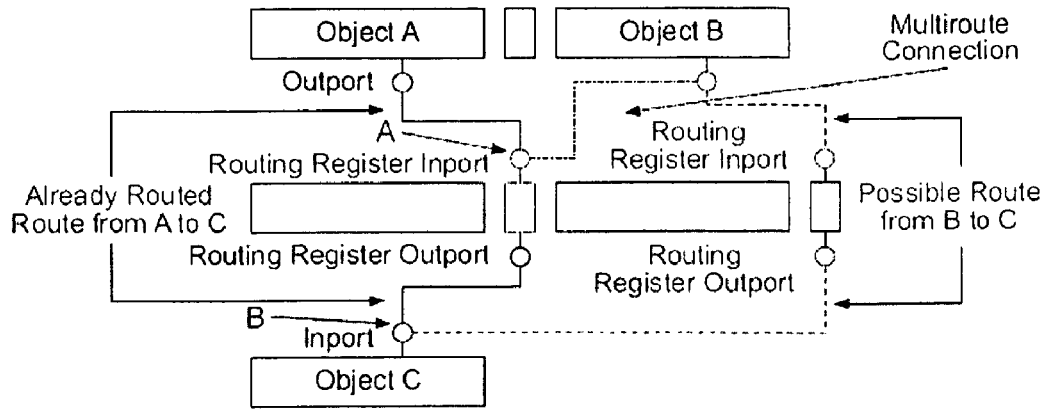
FIG. 2 shows how data from an output port converges at a node and how this may happen at an input of a cell.
Figure 3:
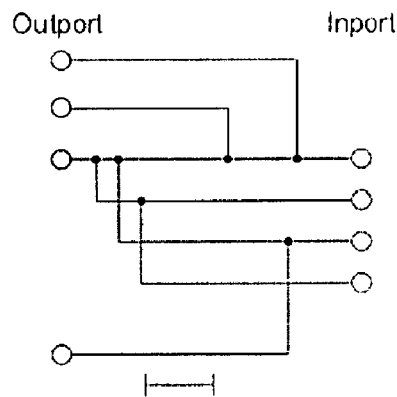
FIG. 3 shows how data converges at a node.
Figure 4:
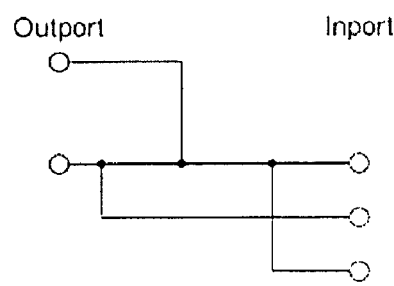
FIG. 4 shows how data converges at a node.

It is possible to provide connections on which a plurality of outputs are combined and are connected to a plurality of inputs, a connection being established in such a way that a path segment separates the input nodes and the output splits. This is illustrated in FIGS. 2 through 4, which show possible allowed and unallowed connections. FIG. 2 shows in general how data from an output port, i.e., an output terminal, converges at a node (arrow A) and how this may happen at an input of a cell (arrow B). FIG. 2 thus shows possibilities for different paths along with data may run from object B (cell) at the top right to a lower object. The lower object may be, for example, a PAE, an IOPAE, etc. FIGS. 3 and 4 show how data converges in an allowed manner at nodes (FIG. 3) because a single path segment is provided between output splits (outport splits) and input nodes (inport joins) between each route.

It is preferable if, after establishing the connections, the maximum latency time of the configuration is determined and/or a maximum frequency corresponding to it for the configuration operation is determined. This information may be used to evaluate the quality of the configuration result and/or for data processing using the configuration.

It is also preferable if, after determining all signal propagation paths along all connections, a propagation-time equalization is performed for signals converging at nodes. In the applicant's XPP technology, for which the present application is particularly preferred, this is possible by providing register stages which may be inserted into the connecting pathways in particular in changing the cell row. First, a connection to the register may be established and then the register number required for balancing is determined. This procedure is particularly advantageous in placement and routing.

In the related art there is still occasionally a problem which it would be advantageous to at least partially relieve in certain situations. Namely, the automatically created placement for feedback, i.e., for program loops, for example, in which data from a downstream cell to a cell which has previously processed data is frequently so inefficient that the feedback must go too far, i.e., the feedback bus is too long (FIG. xxxf). In other words, the sender and receiver of feedback are too far apart. This greatly reduces the processing frequency of reconfigurable modules.

It is desirable now to create a possibility for improving the arrangement and/or interconnection of cells and/or modules containing cells.

A first approach according to the present invention creates an expedient here by introducing registers (R) into the long feedback buses at regular intervals (FIG. xxxa), resulting in a type of pipelining and increasing the clock pulse frequency accordingly, because the transmission times between registers are much shorter than the transmission time directly from the sender to the receiver. However, this method results in a considerable latency time, which in turn greatly reduces the processing performance, in particular in loops.

For wave reconfiguration, it is also possible to provide particularly efficient data processing when a second reconfiguration may be configured immediately after processing the last data word of a first configuration (i.e., in the same cycle or in a cycle shortly following that one) and the first data word of the second configuration is processed immediately thereafter (i.e., in the same cycle or in a cycle which follows that one shortly).

According to FIGS. xxua-xxuc, however, the direction of data flow of each successive configuration changes. Thus, after each processing of a last data word, the next following configuration may be set immediately, but only after reconfiguration of all the cells and buses involved is it possible to begin with the next data processing (FIG. xxsa). An approach according to the present invention thus involves largely maintaining the direction of flow between the cells and merely exchanging the bus systems of the memories (FIG. xxsb). However, this again results in the problem of long run times and low clock pulse rates as described above in conjunction with feedbacks. Here again, as described already, registers which would result in an increase in clock pulse frequency might be introduced. At the same time, however, this would result in a substantial latency time which is in turn undesirable.

In a preferred variant, feedback loops with data streaming through registers are therefore avoided.

It has been found that particularly good results may be achieved when all the cells of a loop are arranged as locally as possible around a loop head (SK), and in particular the loop foot (SF) is placed as close to the SK as possible (FIGS. xxxb, xxxd). A helical arrangement resembling the symbol @ (FIG. xxxc) is also optimal.

It is therefore proposed that for configuration and/or reconfiguration of a multidimensional field and/or cells for data processing in which data is processed in cells, processing results be sent to cells downstream to be processed further there, data being sent from at least one cell downstream to at least one cell upstream, in such a way that the cell position is determined so that the downstream cell is positioned so close to the upstream cell that the feedback time of this connection is not longer than that of any other connection in the configuration.

This may typically be achieved by arranging the downstream cells closer than one-fourth of the total data streaming path in the case of the upstream cell.

This may be achieved particularly well when the cells having the densest data are situated between the upstream end and the downstream end in the form of a coil or in a wave-shaped pattern.

There are various possibilities now for achieving such a feedback loop minimization.

Placements may thus be performed while minimizing virtual forces between cells and other objects, and then the feedback loop minimization is achieved, for example, by introducing another "virtual" spring force from each element of a loop to the loop head (SK) and/or the loop foot (SF). Alternatively and/or additionally, a virtual force may be provided between the loop foot and the loop head. This virtual spring force does not represent a bus connection but instead is used only to achieve the placement arrangement according to the present invention. In particular, the virtual spring force may be different from the spring force of bus connections that actually exist. Other methods of automatically generating the placement arrangement will then be obvious to those skilled in the art in accordance with the particular placement principle.

For very large loops, the cells of the loop are arranged in a wave-shaped pattern around the SK and/or SF (FIG. xxxe) or they are wound around the SK and/or SF, but a wave-shaped arrangement is preferred.

A coil may be achieved by reducing the "virtual" spring forces linearly or uniformly in steps over the length of the loop. FIG. xxxg shows a corresponding example in which the spring forces are reduced incrementally. Coils have the problem that they result in relatively long buses to the core of the coil (SK, SF).

The preferred wave-shaped arrangement may be achieved by assigning periodically higher and lower "virtual" spring forces to SK and/or SF to the particular cells of the loop. For example, such an assignment may be made by a sine function or a quasi-sine function. Such periodic "virtual" spring forces (0, 1, 2, 3) are shown as an example in FIG. xxxe. The periods, i.e., the frequency of the sine function, should be determined optimally so that the first cell after the SK and the last cell before the SF (or the SF itself) have the maximum possible spring force to position them as close together locally as possible. Due to the placement while defining a virtual winding force, different tasks may be configured and/or placed.

Thus, in principle methods may be used which provide for the cell position in a field having cells of selectable function to be determined by minimization of virtual forces on the cells, virtual forces different from zero being provided between the upstream cell and the downstream cell (SF, SK). A memory, in particular a multiport memory, may be provided in the path between the upstream cell and the downstream cell in particular.

Thus, a corresponding method may now be used for optimization of wave reconfiguration. First, it is stipulated that the memories for reading data and writing data are not located on the opposite sides of an array of cells but instead are situated as close together as possible locally according to SK and SF (FIG. xxta). In performing a reconfiguration, only the bus systems between the read/write memories need be exchanged. The buses are therefore only minimally longer, if at all, but this does not result in any considerable impairment of the clock pulse frequency (FIG. xxtb). Further optimization may be achieved by using the same memories for reading the data (operands) and for writing the results, although different memory banks or different read/write pointers in FIFO-like memories are used, for example, and preferably multiport memories are used, permitting simultaneous access to multiple ports. In such a preferred variant, switching the bus systems is also eliminated, because one and the same memory is used.

Using this principle, the direction of data flow does not change in comparison with the wave reconfiguration running direction, which yields optimum performance.

Within an array, a plurality of these arrangements may be implemented at the same time. This is shown in FIGS. xxva-xxvc as an example for two reconfiguration cycles. Likewise, corresponding arrangements from several sides of the array may also be used at the same time. FIGS. xxwa-xxwc show two corresponding reconfiguration cycles as an example.

The method according to FIG. xxx is particularly efficient when the requirements of wave reconfiguration are also taken into account in such a way that SK and/or SF, for example, are to be situated as close as possible locally to a memory (RAM). This is possible, e.g., by rolling out the loop in only three directions (FIG. xxxh), and this is in turn achieved through a suitable periodic buildup of the "virtual" spring forces. Depending on whether the spring forces are built up or reduced uniformly, different arrangements may be achieved. The example shown in FIG. xxxh uses a uniform linear slow buildup and a rapid linear reduction.

What is claimed is:

1. A method of configuring a multidimensional field of reconfigurable interconnected data processing cells, the method comprising:

prioritizing required connections between the data processing cells;

establishing connections having a high priority first; and establishing additional connections after the connections having the high priority have been established.

2. The method as recited in claim 1, wherein the connections are prioritized by taking into account an acceptable delay in data processing.

3. The method as recited in claim 1, further comprising:
defining a boundary around a subset of the data processing cells; and
attempting first to connect the subset of data processing cells via connections within the boundary.

4. The method as recited in claim 3, wherein, when it is impossible to provide all necessary connections within the boundary, establishing a connection outside of the boundary.

5. The method as recited in claim 3, wherein, when it is impossible to establish an additional connection as necessary, a connection that has already been established is disconnected and the additional connection is established, whereupon an attempt is made to provide a replacement for the connection that has been disconnected.

6. The method as recited in claim 1, further comprising:
establishing connections on which a plurality of outputs are combined and which are connected to a plurality of inputs, a connection being established in such a way that a spacer separates input nodes and output splits.

7. The method as recited in claim 1, wherein, after establishing the connections, at least one of: i) a maximum latency time of a configuration is determined, and ii) a maximum corresponding frequency for the configuration is determined.

8. The method as recited in claim 7, wherein prioritization is performed by taking into account at least one of a maximum allowed delay and delay ratios of different connections.

9. The method as recited in claim 8, wherein delay relationships in prioritization take into account a delay of "0," "longer than," "longer than or equal to" and "equal to."

10. The method as recited in claim 1, wherein, after defining all signal travel paths along all connections, a propagation-time equalization is performed for signals converging at nodes.

11. A method for establishing connections between cells of a multidimensional field of reconfigurable data processing cells, the method comprising:
defining a boundary around the cells;
attempting first to connect the cells via a connection within the boundary; and
only if connection of the cells via any connections within the boundary is impossible, establishing a connection outside the boundary for connecting the cells.

\* \* \* \* \*